No. 695,551. Patented Mar. 18, 1902.
J. N. HATCH.
COUPLING FOR BICYCLE PUMPS.
(Application filed Feb. 5, 1901.)
(No Model.)
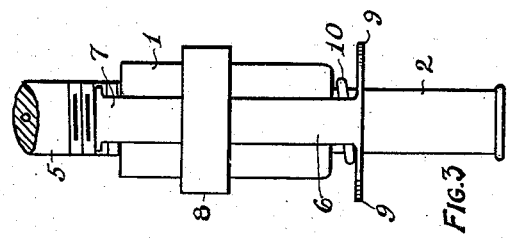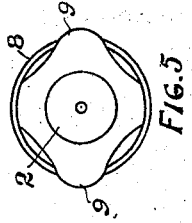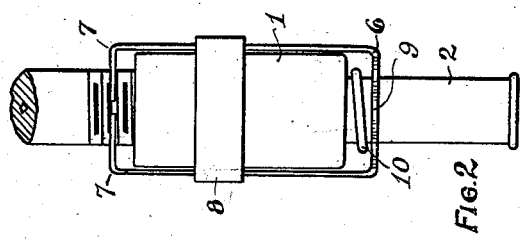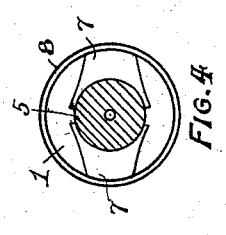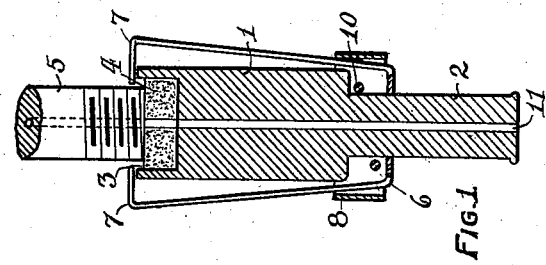
WITNESSES:
Percival H. Granger.
Laura V. Whitcomb.
INVENTOR
James N. Hatch
BY
Charles N. Butler
ATTORNEY

UNITED STATES PATENT OFFICE.

JAMES N. HATCH, OF STREATOR, ILLINOIS.

COUPLING FOR BICYCLE-PUMPS.

SPECIFICATION forming part of Letters Patent No. 695,551, dated March 18, 1902.

Application filed February 5, 1901. Serial No. 46,071. (No model.)

*To all whom it may concern:*

Be it known that I, JAMES N. HATCH, residing at Streator, in the county of Lasalle and State of Illinois, have invented certain new and useful Improvements in Couplings for Bicycle-Pumps, of which the following is a specification.

This invention relates to couplings adapted for attaching the hose of a bicycle-pump to the valve-stem of the tire; and its principal object is to provide simple mechanism for making quick connection and disconnection, for holding the parts in close union, and for fitting any stem.

The characteristics and purposes of my improvements will fully appear from the following description, taken in connection with the accompanying drawings, in which—

Figure 1 is a longitudinal central sectional view in illustration of my invention in position to form the connection. Fig. 2 is a side elevation thereof, illustrating the positions of the parts when the connection has been made. Fig. 3 is a side elevation of the device, taken at right angles to the position illustrated in Fig. 2. Fig. 4 is a top plan view, and Fig. 5 is a bottom plan view.

Referring to the drawings, the body 1 of the coupling has a stem 2, adapted for connection with the pump-hose, and a seat 3, provided with a rubber gasket 4, adapted for connection with the valve-stem 5. A spring-clamp 6, formed from a single piece of steel perforated, so as to be sleeved on the stem 2, and bent, so as to provide the jaws 7, adapted to engage the stem 5, normally occupies the position illustrated in Fig. 8. A ring 8, limited in downward movement by the lugs 9, formed on the base of the clamp, is adapted to close the clamp and hold the jaws in the position illustrated in Fig. 2, a coiled spring 10, acting between the body 1 and the clamp 6, tending to draw the clamp down to the position illustrated in Fig. 1 and to force the seat up against the stem.

In operation the clamp 6 being open the seat 3 and the stem 5 are brought into close engagement. The clamp is then thrust upward against the action of the spring 10 to the position shown in Fig. 2, when the ring 8 is pushed upward, so as to cause the jaws 7 to engage the threaded portion of the stem 5 and lock the coupling. The parts are thus firmly coupled together and a close union maintained between the seat 3 and stem 5 through the thrusting action of the spring 10, which draws down the clamp 6 and forces the seat 3 against the stem 5. Hence the air forced through the passage 11 will not escape at the union between the seat 3 and the stem 5. The parts are disconnected by simply withdrawing the ring.

While these improvements are specially designed for use in a bicycle-pump, it is to be understood that the invention is not limited to such use, but may be employed wherever a coupling is desired.

Having thus described my invention, I claim—

1. In a coupling, a body having a stem thereon, a spring-clamp and lugs formed in a single piece adapted to slide on said stem, said body limiting the longitudinal movement of said clamp, and a ring for locking said clamp, the movement of said ring being limited by said lugs, substantially as specified.

2. In a coupling, a body having a stem thereon, a seat in said body having a gasket therein, a spring-clamp integrally formed and longitudinally movable on said stem, said body being made of such length as to operate to limit the movement of said clamp, a ring for closing and locking said clamp, and a spring for the purpose specified, substantially as set forth.

In testimony whereof I have hereunto set my hand, this 1st day of February, 1901, in the presence of the subscribing witnesses.

JAMES N. HATCH.

Witnesses:
S. W. PLUMB,
W. C. FLICK.